(12) United States Patent
Patterson

(10) Patent No.: US 9,904,601 B2
(45) Date of Patent: *Feb. 27, 2018

(54) SYNCHRONIZATION OF STORAGE USING COMPARISONS OF FINGERPRINTS OF BLOCKS

(71) Applicant: EMC IP Holding Company LLC, Hopkinton, MA (US)

(72) Inventor: R. Hugo Patterson, Los Altos, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/192,500

(22) Filed: Jun. 24, 2016

(65) Prior Publication Data

US 2016/0306703 A1 Oct. 20, 2016

Related U.S. Application Data

(63) Continuation of application No. 14/677,231, filed on Apr. 2, 2015, now Pat. No. 9,400,717, which is a (Continued)

(51) Int. Cl.
*G06F 11/14* (2006.01)
*G06F 17/00* (2006.01)
(Continued)

(52) U.S. Cl.
CPC .......... *G06F 11/1446* (2013.01); *G06F 3/065* (2013.01); *G06F 3/067* (2013.01); *G06F 3/0608* (2013.01); *G06F 3/0641* (2013.01); *G06F 11/1453* (2013.01); *G06F 11/1471* (2013.01); *G06F 17/00* (2013.01); *G06F 17/30* (2013.01);
(Continued)

(58) Field of Classification Search
CPC ............. G06F 11/1446; G06F 11/1453; G06F 11/1471; G06F 17/00; G06F 17/30; G06F 17/30088; G06F 17/30091; G06F 17/30156; G06F 17/3023; G06F 3/0608;
(Continued)

(56) References Cited

U.S. PATENT DOCUMENTS 6,785,786 B1 * 8/2004 Gold .................... G06F 11/1461
711/162
7,694,088 B1 * 4/2010 Bromley ............. G06F 11/1451
711/162

(Continued)

*Primary Examiner* — Kris Mackes
*Assistant Examiner* — Tiffany Bui
(74) *Attorney, Agent, or Firm* — Womble Bond Dickinson (US) LLP

(57) ABSTRACT

A system for processing data includes a data storage device and a processor. The data storage device stores a set of data. The processor is configured to divide the set of data in the data storage system into a set of segments; compute a set of fingerprints, wherein the set of fingerprints comprises a fingerprint for each segment of the set of segments; store the set of fingerprints in a new snapshot; identify a second set of fingerprints in the new snapshot that are not already in a fingerprint index; cause a second set of segments associated with the second set of fingerprints to be stored in a backup data storage system; and cause the second set of fingerprints to be added to the fingerprint index.

19 Claims, 12 Drawing Sheets

Related U.S. Application Data continuation of application No. 14/259,068, filed on Apr. 22, 2014, now Pat. No. 9,026,494, which is a continuation of application No. 13/107,769, filed on May 13, 2011, now Pat. No. 8,745,003.

(51) Int. Cl.
  *G06F 17/30* (2006.01)
  *G06F 3/06* (2006.01)

(52) U.S. Cl.
  CPC .... *G06F 17/3023* (2013.01); *G06F 17/30088* (2013.01); *G06F 17/30091* (2013.01); *G06F 17/30156* (2013.01); *G06F 2201/83* (2013.01); *G06F 2201/84* (2013.01)

(58) Field of Classification Search
  CPC .... G06F 3/0641; G06F 3/065; G06F 2201/83; G06F 2201/84
  USPC .......................................................... 707/639
  See application file for complete search history.

(56) References Cited

U.S. PATENT DOCUMENTS

| | | | | |
|---|---|---|---|---|
| 7,743,028 | B1* | 6/2010 | Stringham | G06F 11/1451 707/646 |
| 7,809,692 | B1* | 10/2010 | Pruthi | G06F 11/1448 707/674 |
| 8,082,231 | B1* | 12/2011 | McDaniel | G06F 11/1453 707/681 |
| 8,095,756 | B1* | 1/2012 | Somavarapu | G06F 11/1453 711/162 |
| 8,290,972 | B1* | 10/2012 | Deshmukh | G06F 17/30489 707/758 |
| 2005/0086241 | A1* | 4/2005 | Ram | G06F 17/30088 |
| 2005/0187992 | A1* | 8/2005 | Prahlad | G06F 11/1435 |
| 2008/0005141 | A1* | 1/2008 | Zheng | G06F 3/0608 |
| 2008/0133828 | A1* | 6/2008 | Saito | G06F 11/1451 711/111 |
| 2009/0187673 | A1* | 7/2009 | Ramjee | H04L 67/2828 709/247 |
| 2010/0042790 | A1* | 2/2010 | Mondal | G06F 3/0608 711/161 |
| 2010/0262586 | A1* | 10/2010 | Rosikiewicz | G06F 17/30067 707/679 |
| 2010/0313040 | A1* | 12/2010 | Lumb | G06F 3/0608 713/193 |
| 2011/0093439 | A1* | 4/2011 | Guo | G06F 11/1453 707/679 |
| 2012/0084269 | A1* | 4/2012 | Vijayan | G06F 3/0652 707/692 |
| 2012/0089579 | A1* | 4/2012 | Ranade | G06F 17/30203 707/693 |
| 2012/0197844 | A1* | 8/2012 | Wang | G06F 11/1464 707/646 |

\* cited by examiner

| T(0)  | fp1 | fp22 | fp14 | fp3 | fp22 | fp49 | fp17 | fp2 | fp85 | fp32 |

| T(-1) | fp1 | fp22 | fp14 | fp3 | fp22 | fp48 | fp17 | fp2 | fp84 | fp32 |

| T(-2) | fp1 | fp22 | fp14 | fp3 | fp22 | fp47 | fp17 | fp2 | fp83 | fp31 |

| T(-3) | fp1 | fp21 | fp14 | fp3 | fp21 | fp46 | fp17 | fp2 | fp82 | fp31 |

| T(-4) | fp1 | fp21 | fp14 | fp3 | fp21 | fp45 | fp17 | fp2 | fp81 | fp31 |

Log File A
03/22/2011 23:11:44 file 34F2A01 mod at byte 48931
03/22/2011 23:11:22 file 34F2A01 mod at byte 47125
03/22/2011 23:11:10 file 4B23019 mod at byte 45687
03/22/2011 23:10:55 file 984E139 mod at byte 15346
03/22/2011 23:10:47 file 149385C mod at byte 09348
03/22/2011 23:10:39 file 25625FA mod at byte 98416
03/22/2011 23:10:15 file 34F2A01 mod at byte 22231
03/22/2011 23:09:51 file EA45BA7 mod at byte 18923

Log File B
03/22/2011 23:11:44 block 34F2A01 at offset 831
03/22/2011 23:11:22 block 34F2A01 at offset 725
03/22/2011 23:11:10 block 4B23019 at offset 587
03/22/2011 23:10:55 block 984E139 at offset 546
03/22/2011 23:10:47 block 149385C at offset 948
03/22/2011 23:10:39 block 25625FA at offset 816
03/22/2011 23:10:15 block 34F2A01 at offset 231
03/22/2011 23:09:51 block EA45BA7 at offset 823

FIG. 4B

SYNCHRONIZATION OF STORAGE USING COMPARISONS OF FINGERPRINTS OF BLOCKS

CROSS REFERENCE TO OTHER APPLICATIONS

This application is a continuation of co-pending U.S. patent application Ser. No. 14/677,231, entitled SYNCHRONIZATION OF STORAGE USING COMPARISONS OF FINGERPRINTS OF BLOCKS filed Apr. 2, 2015 which is a continuation of U.S. patent application Ser. No. 14/259,068, now U.S. Pat. No. 9,026,494, entitled SYNCHRONIZATION OF STORAGE USING COMPARISONS OF FINGERPRINTS OF BLOCKS filed Apr. 22, 2014 which is incorporated herein by reference for all purposes, which is a continuation of U.S. patent application Ser. No. 13/107,769, now U.S. Pat. No. 8,745,003, entitled SYNCHRONIZATION OF STORAGE USING COMPARISONS OF FINGERPRINTS OF BLOCKS filed May 13, 2011 which is incorporated herein by reference for all purposes.

BACKGROUND OF THE INVENTION

Enterprises as well as individuals are becoming increasingly dependent on computers. As more and more data are generated, the need for efficient and reliable file or storage systems is increasing. There are a variety of file or storage systems in existence today, utilizing both local and remote storage. Some file or storage systems use both an originating file or storage system and a replica file or storage system in order to ensure the safety of the data by copying the data from the local to the replica system. Some replica file or storage systems include data versioning, enabling recovery of the state of the originating file or storage system at multiple previous points in time (e.g., a snapshot based block recovery system). Some replica file or storage systems additionally include data storage reduction techniques, for example data compression or data deduplication (e.g., segment deduplication system where a data stream is stored after being chopped up into segments and targeting storing a segment only once in the storage system). In the event of a corruption of stored data on the storage device, it is desirable to restore the data to a point in time known to be before the corruption of stored data occurred. However, simply recopying the entire stored contents of an originating storage system from a replica system is very complex and slow.

BRIEF DESCRIPTION OF THE DRAWINGS

Various embodiments of the invention are disclosed in the following detailed description and the accompanying drawings.

FIG. 3 is a block diagram illustrating an embodiment of a set of snapshots.

FIG. 4A is a diagram illustrating an embodiment of a log file.

FIG. 4B is a block diagram illustrating an embodiment of a log file.

DETAILED DESCRIPTION

Figure 1:
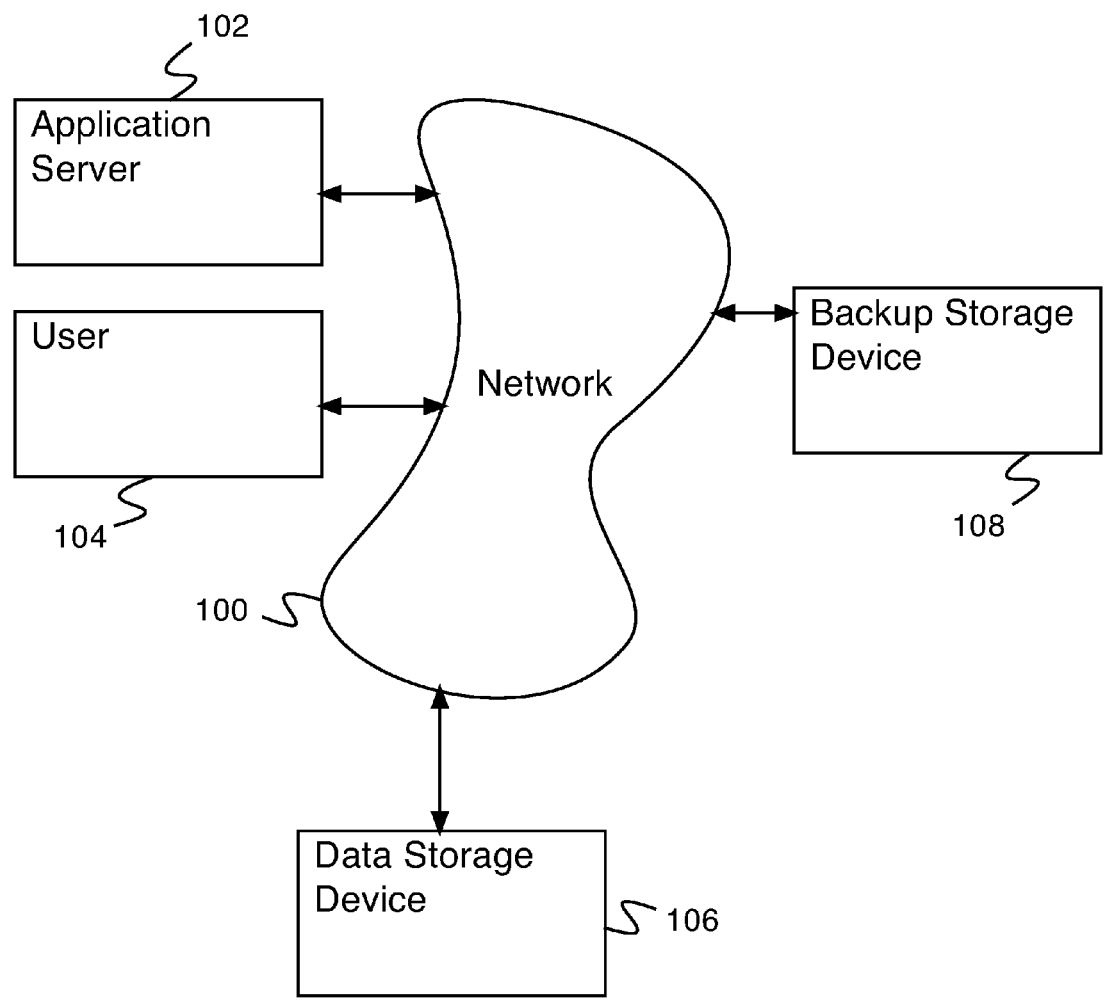
FIG. 1 is a block diagram illustrating an embodiment of a system for synchronization of a storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for processing data comprises a deduplicating system, an interface, and a processor. The deduplicating system stores a copy of data stored in a data storage system by storing a set of segments that is able to reconstruct the data stored in the data storage system. The interface receives an indication to revert data stored in the data storage system to a state of data at a snapshot time stored in the deduplicating system. The processor is configured to determine a subset of the data stored in the data storage system that has changed between the data stored in the data storage system and the state of data at the snapshot time stored in the deduplicating system using a first list of fingerprints associated with the data stored on the data storage system and a second list of fingerprints associated with the state of data at the snapshot time stored in the deduplicating system.

A system for processing data comprises a deduplicating system, an interface, and a processor. The deduplicating system stores a copy of data stored in a data storage system by storing a set of segments that is able to reconstruct the data stored in the data storage system. The data storage system has a stored log file. The stored log file stores a data change and an associated time for the data change. The interface receives an indication to revert data stored in the data storage system to a state at a snapshot time. The processor is configured to determine a first subset of the data stored in the data storage system that has changed since a prior snapshot using the stored log file and to determine a second subset of the data stored in the data storage system that has changed between the prior snapshot and the snapshot time using a first list of fingerprints associated with the prior snapshot and a second list of fingerprints associated with the snapshot time.

Synchronization of storage using log files, snapshots, and comparisons of fingerprints is disclosed. Reversion of a block storage filesystem to a previous data set stored on a replica system without any information regarding the differences between the previous data set and the current data set can be very slow, requiring the entire data set to be copied from the replica system to the block storage filesystem. This process can be sped up by keeping a log file of modifications to the block storage filesystem, enabling the system to know which files have been modified since the time of the previous data set and only revert those, saving considerable time. However, in a large database system, a log file of changes will quickly grow to an unmanageable size, and thus can only be kept for a short period of time. Changes made prior to the beginning of the log file must be tracked in a different way. In order to track older changes in an efficient way, file system snapshots are made on a less frequent, but regular basis, for instance every hour, every 8 hours, every 24 hours, etc. In some embodiments, the storage system comprises a block logical unit number (LUN) storage system.

In some embodiments, a log file is maintained of changes to a block or a segment since a last snapshot backup on a replica system. The replica system maintains a list of fingerprints for each snapshot backup corresponding to blocks or segments that make up the snapshot. In the event that a user desires to restore the originating storage system to the state of a desired snapshot stored on the replica system, the originating system or the replica system uses the log file to determine a list of blocks or segments that have been changed since the last snapshot. The replica system further determines the blocks or segments that have changed from the last snapshot to the desired snapshot. The combined list of changed blocks or segments (e.g., list from the log file and list from the snapshots) indicates the blocks or segments changed from the current state of the blocks or segments on the originating system to the desired snapshot on the replica system. In order to restore or revert the originating storage system to the desired snapshot, the replica system transfer the changed blocks or segments to the originating system or the originating system can wait until a block is requested to provide either a block stored that has not yet changed to the user or to retrieve a changed block from the replica system. In the case of this latter "lazy" approach, the combined list of the changed blocks or segments must be transferred to the originating system so that the originating system can check the list prior to responding to a user request for a block or segment.

In some embodiments, database backup systems comprise deduplicating backup systems. A deduplicating backup system divides the data stored in the block storage filesystem into chunks, known as segments. Each time a data backup is performed, any segment that is determined to already be stored in the database is not stored a second time. Deduplication is performed by creating a master list of file segments stored in the database. Data segments are identified using fingerprints, computed from the segments using a fingerprint function. When a new backup is performed, the data in the block storage filesystem is broken into segments, and the fingerprint of each segment is computed. The fingerprints to be stored are compared with the fingerprints already stored, as indicated in the master list. Any segments with fingerprints not found in the master list are stored in the backup system and their fingerprints are added to the master list. A snapshot file corresponding to the new backup event is then created, listing the fingerprints of each data segment in the block storage filesystem. Data can be reconstructed by assembling the fingerprints as described in the snapshot. In some embodiments, a mapping between a file and one or more segments and/or offsets in segments is stored in order to reconstruct a file from the one or more segments.

In some embodiments, reverting a block storage system to a particular time in the past can be accomplished by stepping through a change log file and reverting changes until the system is in the state corresponding to the most recent snapshot. The most recent snapshot file is compared with the previous snapshot file, and differences between them are reverted to the earlier snapshot. This process is repeated until the snapshot at the desired point in the past is reached. In some embodiments, a list is kept of blocks or segments that are changed from the current snap shot to an earlier snapshot so that only changed blocks are restored from a prior stored version. In some embodiments, it may be possible to compute the changed blocks between any pair of snapshots without stepping from one snapshot to the next. In some embodiments, the fingerprints associated with a first snapshot are compared to the fingerprints of a second snapshot and the blocks or segments associated with different fingerprints between the two snapshots are the blocks or segments that have changed between the two snapshots.

Synchronization of a block storage LUN using comparisons of fingerprints of blocks is disclosed. In some embodiments, the reversion process is accomplished without the use of a log file. When the file or storage system is to be reverted to a previous version, the current state of the file or storage system is used to generate a list of fingerprints for the blocks or segments. The list of fingerprints is then used to compare to a stored version of the file or storage system. For example, the list is calculated on the originating storage system and then shipped to the replica system where the list is compared to the stored list for a given time snapshot. Any blocks or segments that have changed since the stored version are indicated to be restored from the stored version in order to restore the file or storage system (e.g., block storage) to the desired prior state. In some embodiments, the indicated blocks or segments are restored immediately—for example, the indicated blocks are transferred from the replicating system to the originating system along with their fingerprints. In some embodiments, the system indicates that the stored data is available in its prior state; however, a block or segment is only retrieved—if necessary from the replica system—in the event that the block or segment is requested by a user to be read. So, an originating system receives from the replica system a list of blocks or segments (e.g., a list of fingerprints). The originating system, upon receiving a request to read a block or segment, checks that its data has not changed since the prior version. In the event that the block or segment was not changed, the originating system provides the block. In the event that the block or segment was changed, the originating system requests the transfer of the block or segment from the replicating system and then provides the changed block or segment to the user in response to the request to read the block or segment.

FIG. 1 is a block diagram illustrating an embodiment of a system for synchronization of a storage system. In the example shown, the system comprises application server 102, user 104, data storage device 106, and backup storage device 108, each communicating with network 100. User 104 (e.g., a person using a computer system or a computer terminal) accesses applications executing on application server 102 and data stored in data storage device 106. In some embodiments, user 104 accesses data stored on backup storage device 114. In some embodiments, software is used to coordinate synchronization of data between data storage device 106 (e.g., an originating storage system for block or segment storage) and backup storage device 108 (e.g., a replica storage system for block or segment storage). In various embodiments, software used to coordinate synchronization of data is stored on application server 102, data storage device 106, backup storage device 108, or on any other appropriate computing device. In some embodiments, backup storage device 108 comprises a deduplicating system. In some embodiments, data storage device 106 comprises a deduplicating storage system.

In some embodiments, a deduplicating storage system stores an input data stream by breaking up the input data stream into segments. The segments are determined using an anchoring function. For example, a window (e.g., a window of 16, 64, 128, or 256 bytes) is run across the input data stream from a minimum length to a maximum length of a segment (e.g., 2K byte segment to 10K byte segment or 1K byte segment to 16K byte segment). A function is calculated (e.g., a hash function, a cryptographic has function, SHA-1, MD5, RIPEMD, etc.) for each byte offset from minimum to maximum length or for each 16 byte offset from minimum to maximum, etc. In the event that the function calculated is a minimum over all the byte offsets or a maximum over all the byte offsets or a fixed value (e.g., equal to 0, 15, or any other value or set of values), an anchor point is indicated. The anchor point indicates the end of the segment. A fingerprint is calculated for the segment (e.g., a fingerprinting algorithm, like the Rabin algorithm, SHA-1, or any other appropriate algorithm, is used to calculate a fingerprint that maps an arbitrarily large data item such as a block or segment to a much shorter bit string, its fingerprint, that uniquely identifies the original data for all practical purposes). The fingerprint is used to identify the segment. The input data stream can then be expressed as a list of fingerprints. The list of fingerprints can be stored. The input data stream can be reconstructed using the list of fingerprints. The fingerprint is used to determine if the segment has been previously stored from, for example, a prior backup or by another user or as part of another input data stream. In the event that the segment has been previously stored, the segment is not stored again. In the event that the segment has not been previously stored, the segment is stored. The location of the segment is indexed using the fingerprint, so that the fingerprint can be used to locate the segment stored on the storage system.

Network 100 comprises one or more of the following: a local area network, a wide area network, a wired network, a wireless network, the Internet, a fiber network, a storage area network, or any other appropriate network enabling communication. In various embodiments, data storage device 106 and backup storage device 108 comprise single storage devices such as a hard disk, a tape drive, a semiconductor memory, a plurality of storage devices such as a redundant array system (e.g., a redundant array of independent disks (RAID)), a system for storage such as a library system or network attached storage system, a virtual storage (e.g., a LUN, or logical unit), or any other appropriate storage device or system.

In some embodiments, backup storage device 108 stores not only the current state of data storage device 106, but also information describing previous states of data storage device 106. In some embodiments, backup storage device 108 only keeps a record of changes made to storage device 106 at certain times (e.g., at fixed times of the day, at a predetermined interval, after a certain number of changes, etc.). In some embodiments, backup storage device 108 keeps for each previous state a record of the fingerprints comprising the state.

Figure 2:
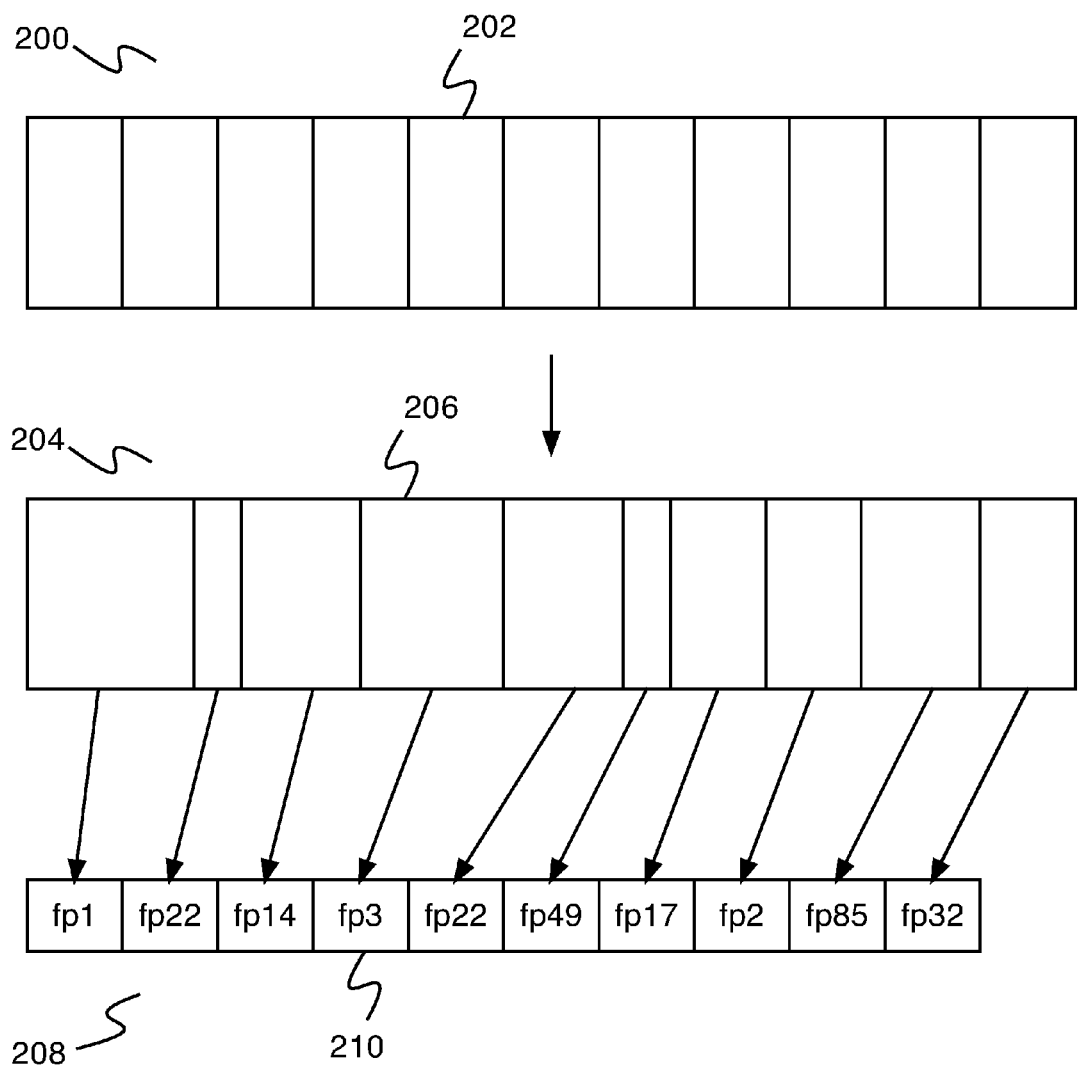
FIG. 2 is a block diagram illustrating an embodiment of data storage.

FIG. 2 is a block diagram illustrating an embodiment of data storage. In some embodiments, the data storage shown in FIG. 2 comprises data storage on data storage device 106 of FIG. 1 and backup storage device 108 of FIG. 1. In the example shown, data 200 comprises data stored in data storage device 106 of FIG. 1. Data 200 comprises a plurality of blocks (e.g., block 202). In some embodiments, blocks comprise physical regions of data; blocks are of a fixed size and boundaries between blocks are at fixed locations. In some embodiments, an entire block is read or written in a single operation.

Data 204 comprises data stored in backup storage device 108 of FIG. 1. In the example shown, data 204 comprises the same data as data 200. Data 204 is divided into segments (e.g., segment 206). In some embodiments, segments are of a fixed size. In the example shown, segments are of variable sizes. Segments comprising data 204 may be larger, smaller, or the same size as blocks comprising data 200. In the example shown, segments comprising data 204 are of similar size to blocks comprising data 200, with some segments larger than blocks and some segments smaller than blocks. In various embodiments, segments are approximately the same size as blocks, exactly the same size as blocks, larger than blocks, smaller than blocks, or any other appropriate size relative to blocks. In various embodiments, there are more segments than blocks, fewer segments than blocks, or the same number of segments as blocks.

In some embodiments, a block storage unit is used as an originating storage system. In the event that it is desired to recover a given block from a replica storage system, where in the replica storage system the data is stored using segments, one or more segments may be required to recover the block. For example, in the event that the segment spans the block, only one segment may be required to be read from the replica storage device and the relevant data extracted from within a transferred segment and placed within the block. In the event that the segment is smaller than a block several segments may need to be transferred from the replica system in order to be able to extract the appropriate data for the block. In various embodiments, the extraction or determination of the block to segment mappings can take place entirely on the originating system, split between the originating system and the replica system, or on the replica system. For example, it may be more efficient to identify the block needed to be recovered or reconstructed and ship that block number to the replica device. The replica system then recovers the one or more segments required to reconstruct that block and then ship only the data required to reconstruct or recover the block. Or the replica system could transfer all segments required to the originating system, and the originating system could appropriately rewrite the block with the extracted data from the transferred segments.

Snapshot 208 comprises an indication of a data storage set at a given point in time—for example, a set of fingerprints (e.g., fingerprint 210) corresponding to the data segments comprising data 204. Each fingerprint comprising snapshot 208 is computed from the corresponding segment from data 204. Fingerprint 210 is computed from data segment 206. In some embodiments, fingerprints are computed from segments using a hash function, a cryptographic hash function, or any other appropriate function. Snapshot 208 comprises a record of the state of data 200 at the time the snapshot was made. Data 200 can be recreated from snapshot 208 by locating the segments comprising data 204 in the storage device (e.g., backup storage device 108 of FIG. 1) and arranging them in the appropriate order. Segments are located in the storage device using fingerprints. For example, a fingerprint is used to look up the stored location for a segment on a replica storage device. The segment can then be retrieved from the replica storage device using the identified stored location.

In some embodiments, if two segments present in data 204 are identical, the data stored in those segments is only stored in the storage device once, and the fingerprint information is repeated in the snapshot to indicate that the data was originally present twice. In some embodiments, the function used to compute the segment boundaries is designed to segment repeated data in predictable locations, e.g., to create as many identical segments as possible in the case of repeated data. In some embodiments, the process of creating a snapshot is executed on the originating storage device (e.g., storage device 106 of FIG. 1). The snapshot is then transmitted to the backup storage device (e.g., backup storage device of FIG. 1). The backup storage device determines which fingerprints in the snapshot correspond to segments not already stored on the backup storage device and requests them from the originating storage device. In some embodiments, the backup storage device determines which fingerprints in the snapshot correspond to segments not already stored on the backup storage device using a fingerprint index. A fingerprint index comprises a list of every segment stored in the backup storage device, along with its corresponding fingerprint and storage location. The fingerprint index can be searched for a fingerprint to determine whether a segment with that fingerprint exists on the backup storage device, and if it does, identify the location of the segment in the backup storage device. The originating storage device then transmits the new data segments to the backup storage device, and they are stored.

FIG. 3 is a block diagram illustrating an embodiment of a set of snapshots. In the example shown, each row comprises a list of fingerprints associated with a snapshot (e.g., snapshot 208 of FIG. 2) of data stored in a storage device (e.g., data storage device 106 of FIG. 1). Each list indicates a set of fingerprints (e.g., fingerprint 210 of FIG. 2) corresponding to segments (e.g., segment 206 of FIG. 2) stored in a backup storage device (e.g., backup storage device 108 of FIG. 1). Each row corresponds to a snapshot made at a different point in time, e.g., the row labeled T(0) comprises a current snapshot, the row labeled T(−1) comprises the previous snapshot (e.g., a snapshot 2 hours ago, 8 hours ago, a day ago, a week ago, etc.), the row labeled T(−2) comprises the snapshot before that, and so on. The state of the data stored in the storage device at the time any of the snapshots was made can be recovered by locating the data segments in the backup storage device as indicated by the fingerprints comprising the snapshot, and arranging the segments in the appropriate order.

A storage device can be reverted from the point in time stored in one snapshot to the point in time stored in another snapshot in an efficient manner by comparison of the snapshot fingerprint lists. The efficiency of the manner takes advantage of the fact that in the case when only a small part of the data is found to be changed each time a snapshot is made, then the changes between snapshots are only to a small number of segments/blocks. For instance, if the storage device represented by the snapshot labeled T(0) is to be reverted to the data stored at the time when the snapshot labeled T(−3) was made, it is seen that fp22 is to be replaced by fp21 in two places, fp49 is to be replaced by fp46, fp85 is to be replaced by fp82, and fp32 is to be replaced by fp31. The segments corresponding to these four fingerprints are located in the backup storage device and transmitted to the storage device, and replace the original data segments.

FIG. 4A is a diagram illustrating an embodiment of a log file. In some embodiments, a log file is used to track the modifications made to a storage device (e.g., storage device 106 of FIG. 1). In the example shown, log file 400 (e.g., log file A) comprises a set of log entries each corresponding to a modification made to a storage device. In the example shown, each log entry comprises a date and time of the modification, an indicator of the file modified, and an indicator of the location of the modification within the file (e.g., a byte location within the file of the beginning of the change and length of the changed region—a location and an offset, or a byte location of the beginning and a byte location of the end, or any other appropriate indicator). In various embodiments, each log entry comprises one or more of the following: a date of a modification, a time of a modification, a file indicator, a file location identifier, a modification identifier, a file segment (e.g., segment 206 of FIG. 2) indicator, modified data information, removed data information, added data information, or any other appropriate information. In some embodiments, the log file is used to revert modifications made to the storage device. In some embodiments, the log file comprises enough information to revert modifications made to the storage device without reference to any other file or storage device. In some embodiments, the log file comprises enough information to locate unmodified data within a backup storage device (e.g., backup storage device 108 of FIG. 1) and revert changes made to the storage device using the unmodified data. In various embodiments, a log file is kept for the life of the storage device, for as long as there is storage available to continue adding to the log file, for a specific period of time, until the most recent snapshot was made, or for any other appropriate duration of time.

FIG. 4B is a block diagram illustrating an embodiment of a log file. In the example shown, log file 402 (e.g., log file B) shows a log file with a list of change times and dates and a block number. In some embodiments, blocks are stored in their entirety and changed in their entirety so that a whole block is overwritten using its location and the block size as its length (e.g., usually a fixed block size). The changes can be used to indicate which blocks have changed since a prior snapshot.

Figure 5:
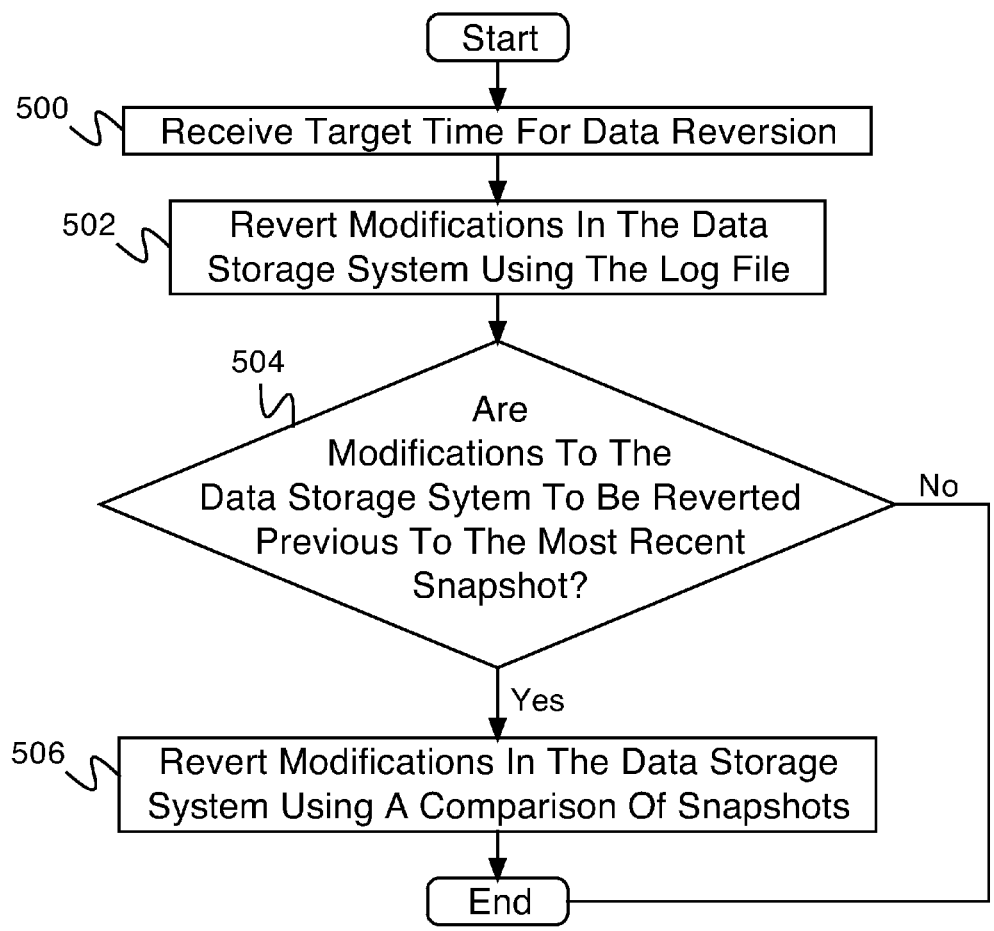
FIG. 5 is a flow diagram illustrating an embodiment of a process for synchronization of a block storage LUN using log files and snapshots.

FIG. 5 is a flow diagram illustrating an embodiment of a process for synchronization of a block storage LUN using log files and snapshots. In some embodiments, the process of FIG. 5 is executed by the system of FIG. 1 for synchronization of a data storage device (e.g., data storage device 106 of FIG. 1) and a backup storage device (e.g., backup storage device 108 of FIG. 1). In some embodiments, the process of FIG. 5 is used to revert the state of the data storage device to a previous state stored on the backup storage device. In the example shown, in 500, a target time for data reversion is received. In some embodiments, the target time for data reversion (e.g., the data is set to the state of the data as of the target time) comprises the target time to revert the state of the data storage device to. In various embodiments, the target time for data reversion is entered into a field, picked from a list, automatically determined, or determined in any other appropriate way. In some embodiments, the target time for data reversion may only be one of a predetermined set of possible times (e.g., only the times in the past when a snapshot was made). In 502, modifications to the data storage system are reverted using a log file (e.g., log file 400 of FIG. 4). In 504, it is determined whether modifications to the data storage system are to be reverted prior to the most recent snapshot. If modifications to the data storage system are not to be reverted prior to the most recent snapshot, the process ends. If modifications to the data storage system are to be reverted prior to the most recent snapshot, control passes to 506. In 506, modifications are reverted using a comparison of snapshots (e.g., snapshots as in snapshot 208 of FIG. 2). In some embodiments, modifications are reverted using a comparison of the most recent snapshot and the snapshot made at the closest possible time to the target time for data reversion.

Figure 6:
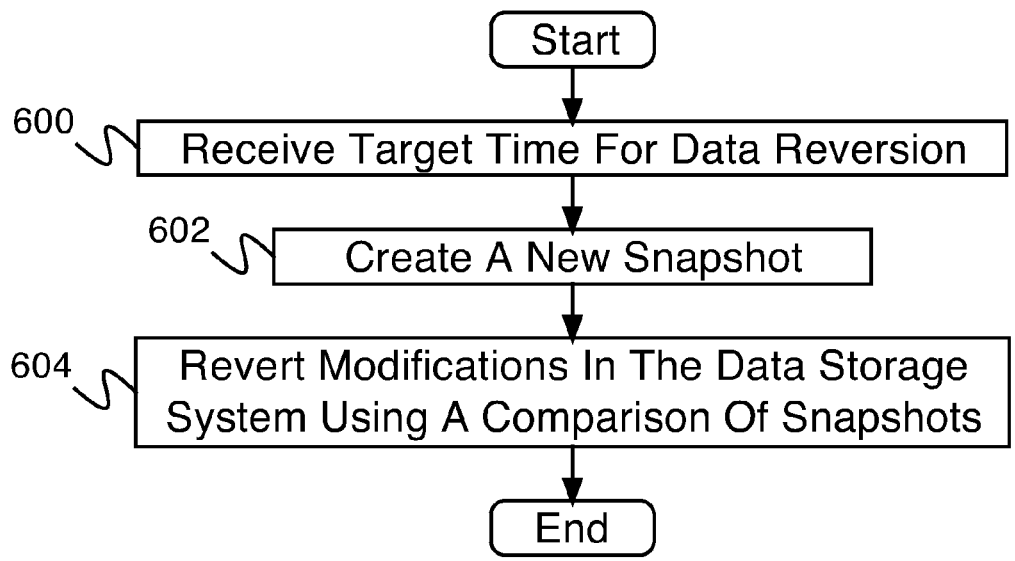
FIG. 6 is a flow diagram illustrating an embodiment of synchronization of a block storage LUN using comparisons of fingerprints of blocks.

FIG. 6 is a flow diagram illustrating an embodiment of synchronization of a block storage LUN using comparisons of fingerprints of blocks. In some embodiments, the process of FIG. 6 is executed by the system of FIG. 1 for synchronization of a data storage device (e.g., data storage device 106 of FIG. 1) and a backup storage device (e.g., backup storage device 108 of FIG. 1). In some embodiments, the process of FIG. 6 is used to revert the state of the data storage device to a previous state stored on the backup storage device. In the example shown, in 600, a target time for data reversion is received. In some embodiments, the target time for data reversion comprises the target time to revert the state of the data storage device to. In various embodiments, the target time for data reversion is entered into a field, picked from a list, automatically determined, or determined in any other appropriate way. In some embodiments, the target time for data reversion may only be one of a predetermined set of possible times (e.g., only the times in the past when a snapshot was made). In 602, a new snapshot (e.g., a snapshot as in snapshot 208 of FIG. 2) is created. For example, the data stored is segmented and a list of fingerprints is generated corresponding to the segments. In 604, modifications are reverted using a comparison of snapshots. In some embodiments, modifications are reverted using a comparison of the snapshot made in 602 and the snapshot made at the closest possible time to the target time for data reversion. For example, a comparison of fingerprints associated with the snapshots and the segments in each of the snapshots are used to compare the snapshots. In some embodiments, reverting the data in the snapshots comprises identifying segments or blocks that are different and transferring either all at once or slowly over time the identified segments or blocks that are to be changed.

Figure 7A:
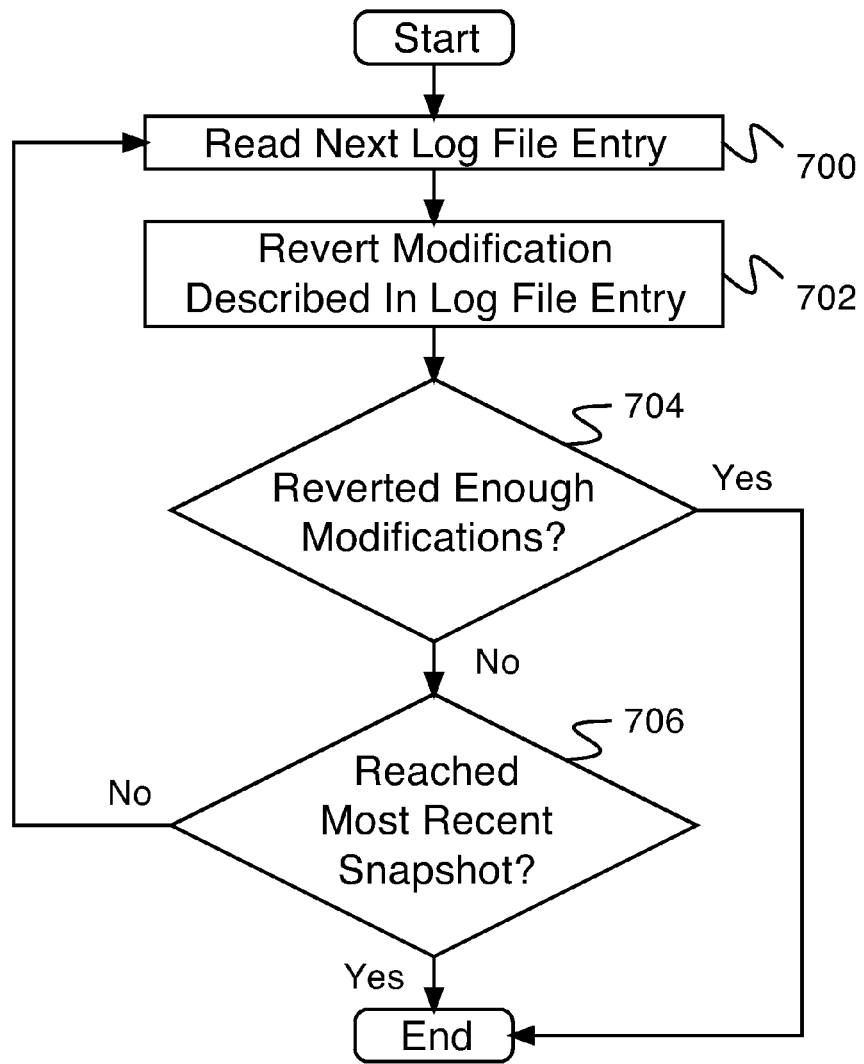
FIG. 7A is a flow diagram illustrating an embodiment of a process for reverting modifications to a data storage system using a log file.

FIG. 7A is a flow diagram illustrating an embodiment of a process for reverting modifications to a data storage system using a log file. In some embodiments the log file of FIG. 7A comprises log file 400 of FIG. 4. In some embodiments, the process of FIG. 7A implements 502 of FIG. 5. In the example shown, in 700, the next log file entry is read. In various embodiments, the next log file entry comprises one or more of the following: a date of a modification, a time of a modification, a file indicator, a file location identifier, a modification identifier, a file segment (e.g., segment 206 of FIG. 2) indicator, modified data information, removed data information, added data information, or any other appropriate information. In 702, the modification described in the log file entry is reverted. In some embodiments, the log file entry comprises enough information to revert the modification, e.g., the log file entry comprises the location of the modification as well as the original data present in the place of the modified data. In some embodiments, the log file entry comprises enough information to revert the modification in conjunction with a backup storage device (e.g., backup storage device 108 of FIG. 1)—for example, the log file entry comprises the location of the modification as well as the location in a backup storage device of the original data present in place of the modified data. In some embodiments, reverting a modification comprises replacing the modified data with the original data. In 704, it is determined whether enough modifications have been reverted. In some embodiments, determining whether enough modifications have been reverted comprises comparing the time of the most recent modification reverted with a target time for data reversion (e.g., the target time for data reversion received in 500 of FIG. 5). It is determined that enough modifications have been reverted if the time of the most recent modification is prior to or equal to the target time for data reversion. If it is determined that enough modifications have been reverted, the process ends. If it is determined that not enough modifications have been reverted, control passes to 706. In 706 it is determined whether the most recent snapshot has been reached. In some embodiments, determining whether the most recent snapshot has been reached comprises comparing the time of the most recent modification with the time of the most recent snapshot. If the time of the most recent modification is equal to the time of the most recent snapshot. In some embodiments, the log file is only maintained until the most recent snapshot, and determining whether the most recent snapshot has been reached comprises determining whether the log file entry read in 700 was the last entry in the log file. If it is determined that the most recent snapshot has been reached, the process ends. If it is determined that the most recent snapshot has not been reached, control passes to 700, and the process repeats.

Figure 7B:
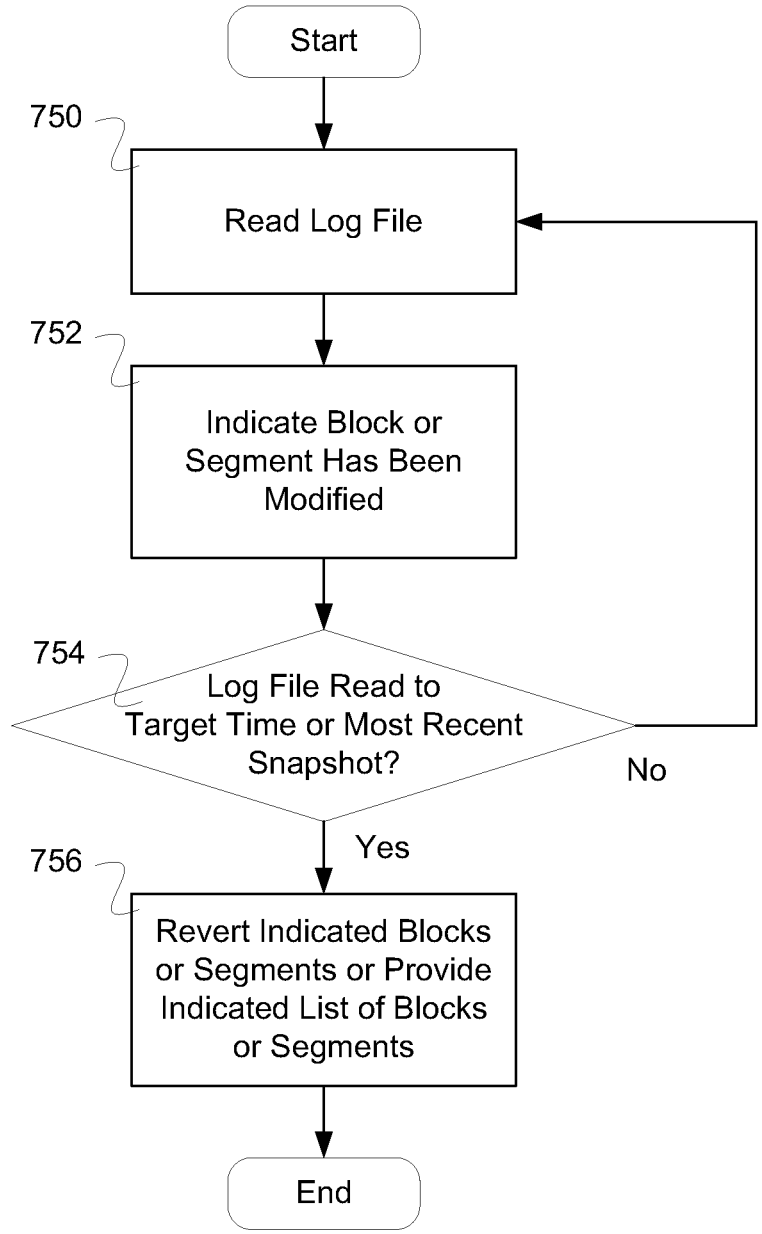
FIG. 7B is a flow diagram illustrating an embodiment of a process for using a log file during reverting or synchronizing.

FIG. 7B is a flow diagram illustrating an embodiment of a process for using a log file during reverting or synchronizing. In the example shown, in 750, a log file is read. In 752, a block or segment is indicated to have been modified. In 754, it is determined whether the log file has been read to the target time or the most recent snapshot. In the event that the log file has not been read to the target time or the most recent snapshot, control passes to 750. In the event that the log file has been read to the target time or the most recent snapshot, control passes to 756. In 756, the indicated blocks or segments are reverted (e.g., a copy of the data is transmitted from the backup system to the original system) or the indicated list of blocks or segments is provided (e.g., to be used in combination with a snapshot list of changes between snapshots so that an efficient reverting of data blocks or segments can be achieved).

Figure 8:
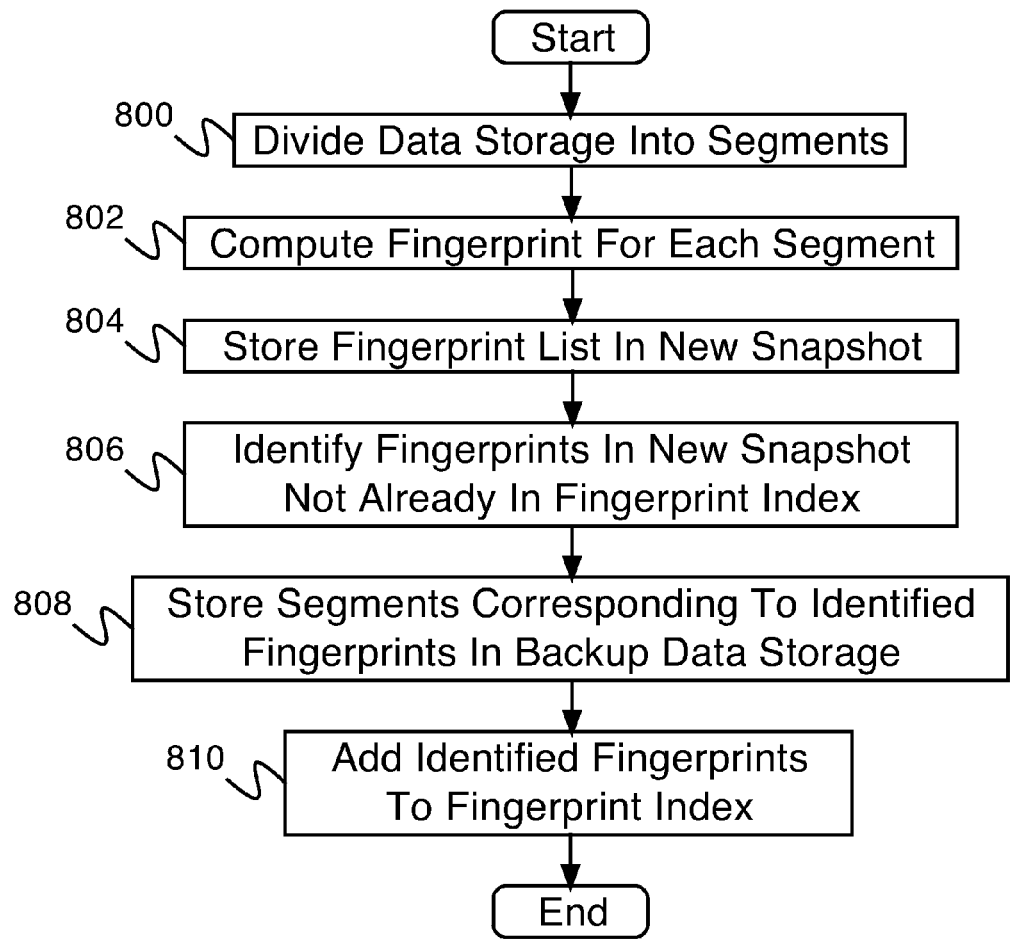
FIG. 8 is a flow diagram illustrating an embodiment of a process for creating a new snapshot.

FIG. 8 is a flow diagram illustrating an embodiment of a process for creating a new snapshot. In some embodiments, the new snapshot comprises snapshot 208 of FIG. 2. In some embodiments, the flow diagram of FIG. 8 implements 602 of FIG. 6. In the example shown, in 800, the data storage device (e.g., data storage device 106 of FIG. 1) is divided into segments (e.g., as in segmented data 204 of FIG. 2). In 802, a fingerprint (e.g., fingerprint 210 of FIG. 2) is computed for each data segment, creating a list of fingerprints. In 804, the list of fingerprints created in 802 is stored in a new snapshot (e.g., snapshot 208 of FIG. 2). In various embodiments, the snapshot is stored on the data storage device, on the backup storage device (e.g., backup storage device 108 of FIG. 1), on both the data storage device and the backup storage device, on another storage device, or in any other appropriate location. In 806, fingerprints in the new snapshot created in 804 that are not already in the fingerprint index (e.g., the fingerprint index as described in the section regarding FIG. 2) are identified. In some embodiments, identifying fingerprints in the new snapshot that are not already in the fingerprint index comprises comparing each fingerprint in the new snapshot with each fingerprint in the fingerprint index and identifying fingerprints not already in the fingerprint index. In 808, segments corresponding to the identified fingerprints are stored in the backup data storage. In 810, the identified fingerprints are added to the fingerprint index. In some embodiments, identified fingerprints are added to the fingerprint index along with location information for locating the corresponding segments stored in backup data storage in 808.

Figure 9:
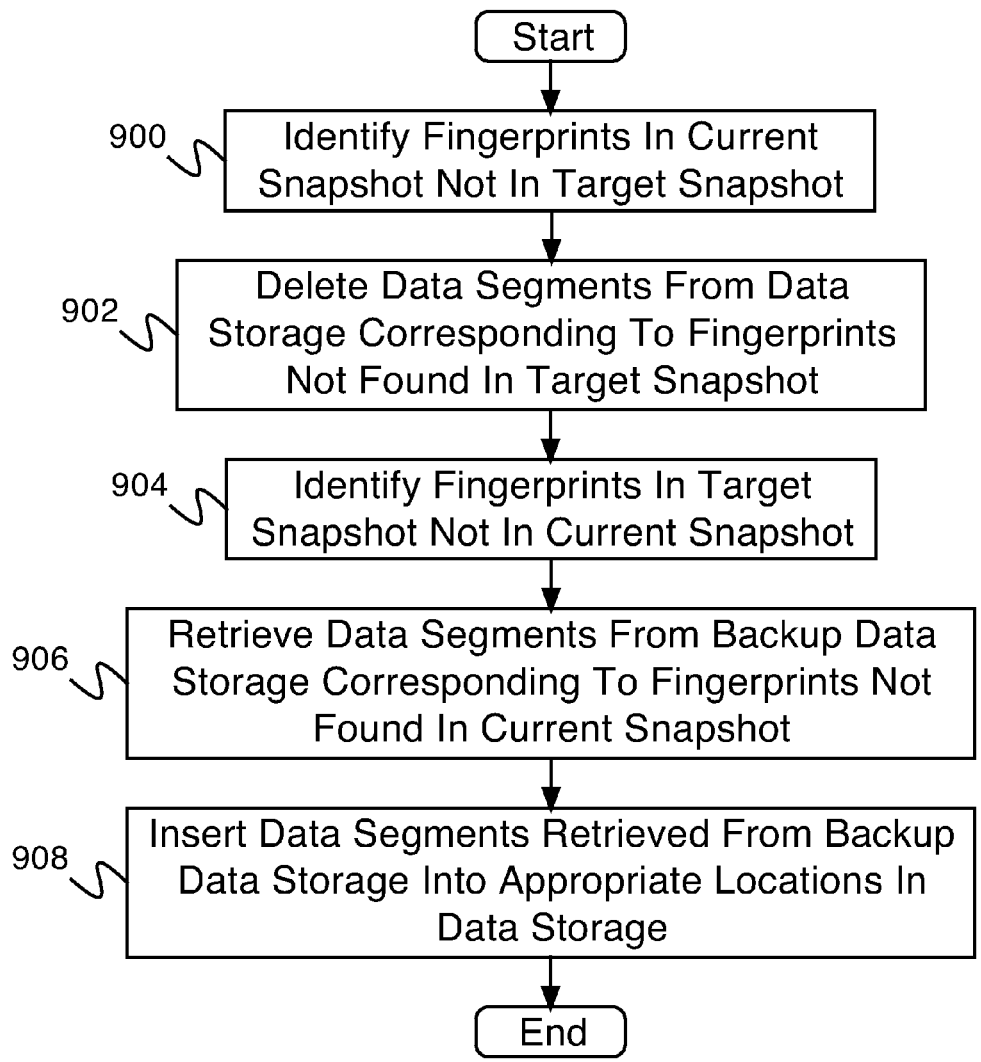
FIG. 9 is a flow diagram illustrating an embodiment of a process for reverting modifications in a data storage system using a comparison of snapshots.

FIG. 9 is a flow diagram illustrating an embodiment of a process for reverting modifications in a data storage system using a comparison of snapshots. In some embodiments, the data storage system comprises data storage system 106 of FIG. 1. In some embodiments, the process of FIG. 9 implements 506 of FIG. 5 and 604 of FIG. 6. In some embodiments, the process of FIG. 9 comprises a process for reverting a current snapshot to a target snapshot. In the example shown, in 900, fingerprints in the current snapshot that are not in the target snapshot are identified. In 902, data segments from the data storage corresponding to fingerprints that are not found in the target snapshot are deleted. In 904, fingerprints that are in the target snapshot that are not in the current snapshot are identified. In 906, data segments corresponding to fingerprints that are not found in the current snapshot are retrieved from the backup data storage (e.g., backup data storage 108 of FIG. 1). In 908, the data segments retrieved from the backup data storage are inserted into the appropriate locations in the data storage, as indicated in the target snapshot.

Figure 10:
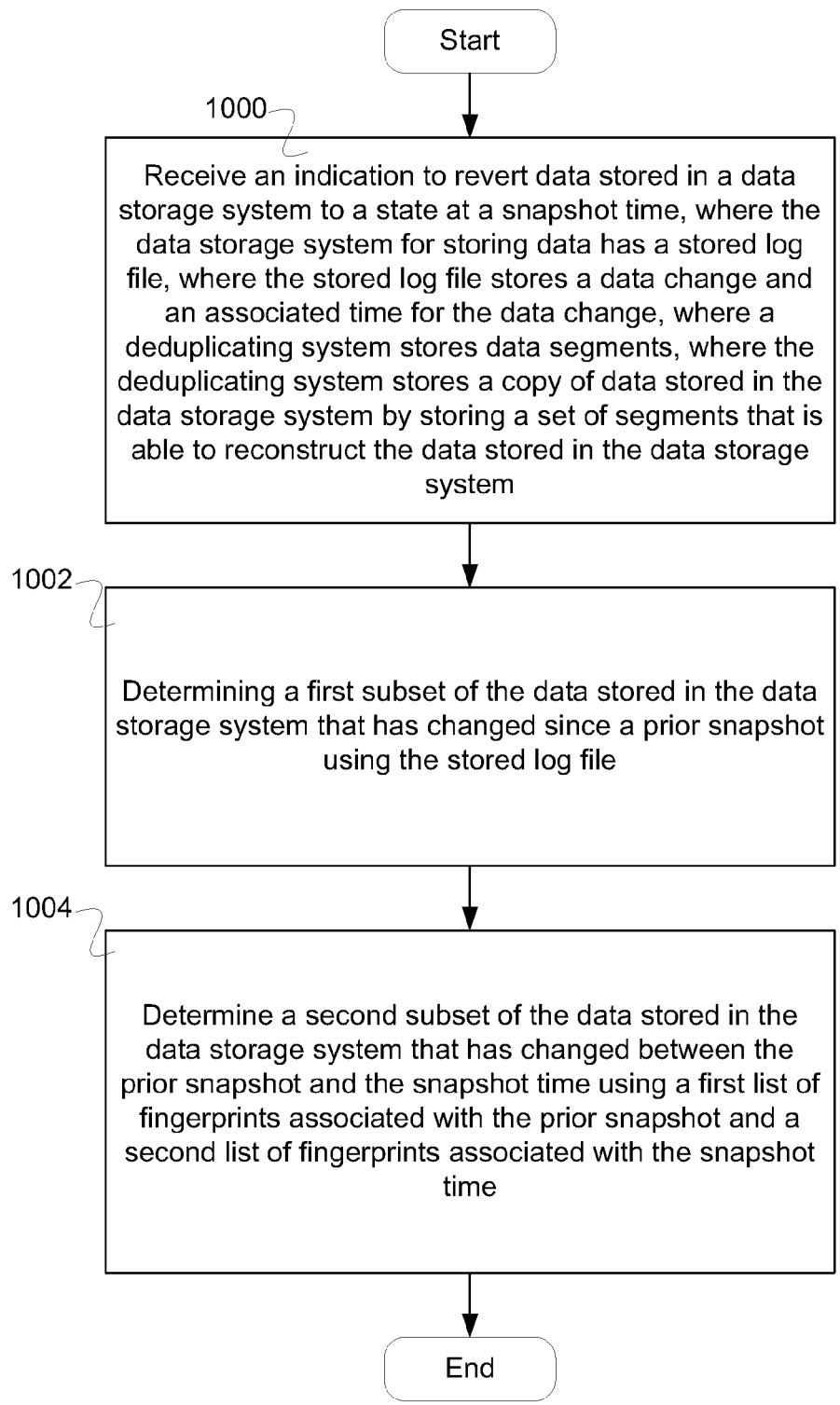
FIG. 10 is a flow diagram illustrating an embodiment of a process for synchronizing or reverting data.

FIG. 10 is a flow diagram illustrating an embodiment of a process for synchronizing or reverting data. In the example shown, in 1000 an indication is received to revert data stored in a data storage system to a state at a snapshot time, wherein the data storage system for storing data has a stored log file, wherein the stored log file stores a data change and an associated time for the data change, wherein a deduplicating system stores data segments, wherein the deduplicating system stores a copy of data stored in the data storage system by storing a set of segments that is able to reconstruct the data stored in the data storage system. In 1002, a first subset of the data stored in the data storage system is determined that has changed since a prior snapshot using the stored log file. In 1004, a second subset of the data stored in the data storage system is determined that has changed between the prior snapshot and the snapshot time using a first list of fingerprints associated with the prior snapshot and a second list of fingerprints associated with the snapshot time.

For example, in some embodiments, a block storage system has a log file and is connected to a data deduplication system that has snapshots stored. In the event that a user indicates that the block storage system is to be reverted to a state of a target time, the block storage system identifies a list of blocks or segments that have been changed since the target time using a log file. In some embodiments, the blocks or segments are reverted by backing out the changes in the log file, which can be a slow process. In some embodiments, the blocks or segments are marked in a list as having been changed. If the target time is past the most recent snapshot time, changes are noted from the log file up until the most recent snapshot time. The changes between snapshot times are made using fingerprint lists for segments associated with the snapshots. In various embodiments, fingerprint lists correspond to segments, blocks, files, or any other appropriate data size units. In some embodiments, fingerprints are calculated for the blocks stored on the block storage system. In some embodiments, fingerprints are calculated for segments created from the data stored on the blocks stored on the block storage system. In some embodiments, a mapping between the segments and blocks is stored to enable translating block and segment translations. In some embodiments, once the changed blocks are identified, the appropriate segments are read from the deduplicating system in order to replace the blocks on the block storage system to achieve the data state of the target time.

Figure 11:
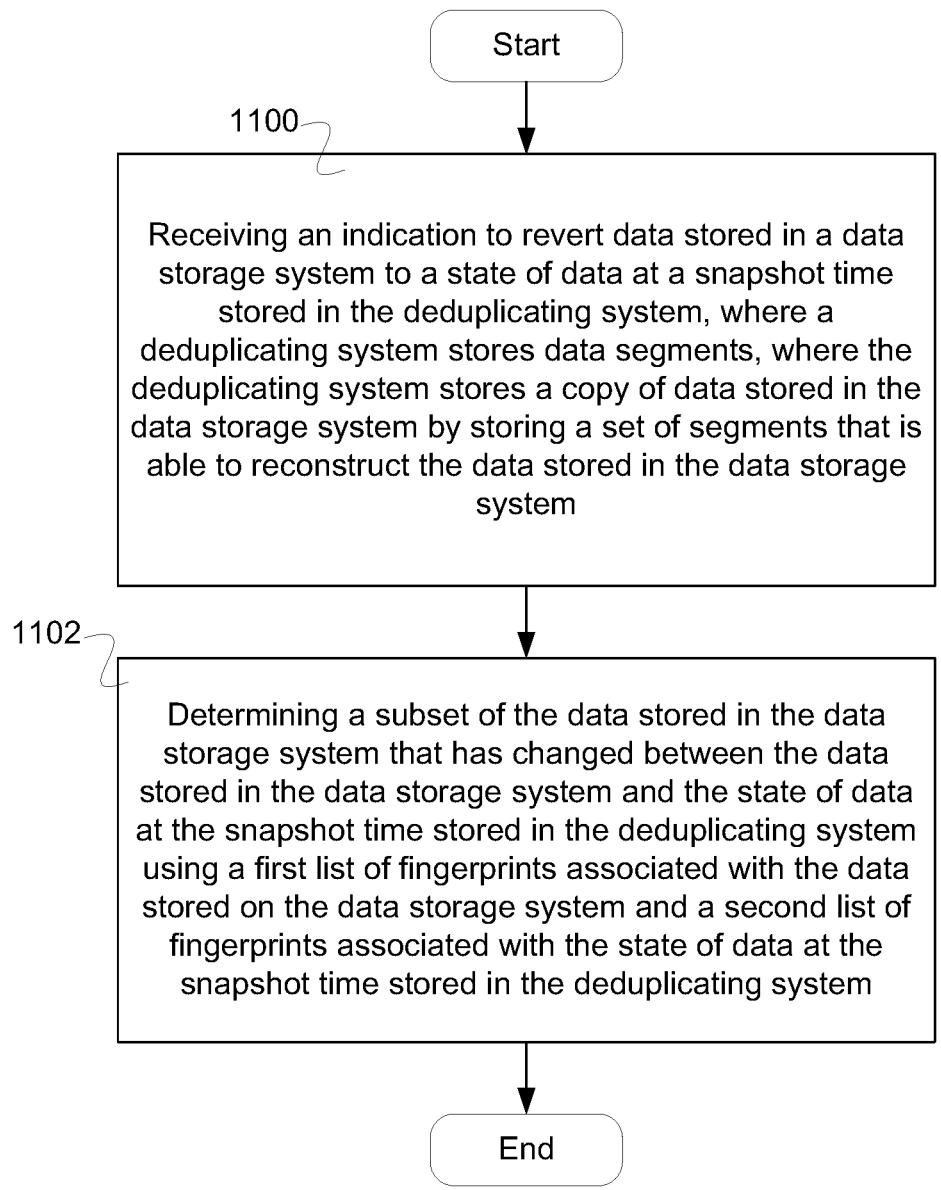
FIG. 11 is a flow diagram illustrating an embodiment of a process for synchronizing or reverting data.

FIG. 11 is a flow diagram illustrating an embodiment of a process for synchronizing or reverting data. In the example shown, in 1100, an indication is received to revert data stored in a data storage system to a state of data at a snapshot time stored in the deduplicating system, wherein a deduplicating system stores data segments, wherein the deduplicating system stores a copy of data stored in the data storage system by storing a set of segments that is able to reconstruct the data stored in the data storage system. In 1102, a subset of the data stored in the data storage system is determined that has changed between the data stored in the data storage system and the state of data at the snapshot time stored in the deduplicating system using a first list of fingerprints associated with the data stored on the data storage system and a second list of fingerprints associated with the state of data at the snapshot time stored in the deduplicating system.

For example, in some embodiments, a block storage data system is indicated by a user to be synchronized with a deduplicated storage system at a given snapshot time or in its current state. A list of fingerprints of the block storage data, either by block or by segment, is calculated. This list of fingerprints is compared to a stored or calculated list of fingerprints of the data stored on the deduplication storage system. Only blocks or segments with different fingerprints need to be changed on the block storage system. These blocks can all be changed immediately, slowly over time, or only when a user requests a given block, segment, or file.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for processing data comprising:
    a data storage device, wherein the data storage device stores a set of data; and
    a processor is configured to:
        divide the set of data in the data storage device into a set of segments;

compute a set of fingerprints, wherein the set of fingerprints comprises a fingerprint for each segment of the set of segments;

store the set of fingerprints in a new snapshot stored in the data storage device, wherein the new snapshot comprises an indication of the set of segments at a given point in time;

identify a second set of fingerprints in the new snapshot that are not already in a fingerprint index including comparing each fingerprint in the new snapshot with each fingerprint in the fingerprint index;

cause a second set of segments associated with the second set of fingerprints to be stored in a backup data storage system;

cause the second set of fingerprints to be added to the fingerprint index;

identify a third set of fingerprints in the new snapshot that are not found in a list of fingerprints in a target snapshot;

delete a first subset of data stored in the data storage device, wherein the first subset of data are associated with the third set of fingerprints;

retrieve a second subset of data from the backup data storage system, wherein the second subset of data are associated with fingerprints that are found in the list of fingerprints in the target snapshot; and insert the second subset of data into appropriate locations in the data storage device.

2. The system as in claim 1, wherein the data storage device for storing data comprises a block storage system.

3. The system as in claim 1, wherein the backup data storage system comprises a deduplicating storage system.

4. The system as in claim 1, wherein a block is associated with one or more segments of the set of segments.

5. The system as in claim 4, wherein the block is restored by reading the one or more segments from the backup data storage system and used to reconstruct the block.

6. The system as in claim 5, wherein the processor is further configured to transfer the one or more segments from the backup data storage system to the data storage device.

7. The system as in claim 6, wherein transferring the one or more segments comprises transferring the one or more segments requested by a user.

8. The system as in claim 1, wherein the new snapshot is one of a plurality of snapshots.

9. The system as in claim 1, wherein the new snapshot is associated with a snapshot time.

10. A method for processing data, comprising:
dividing a set of data in a data storage device into a set of segments;

computing, using a processor, a set of fingerprints, wherein the set of fingerprints comprises a fingerprint for each segment of the set of segments;

storing the set of fingerprints in a new snapshot stored in the data storage device, wherein the new snapshot comprises an indication of the set of segments at a given point in time;

identifying a second set of fingerprints in the new snapshot that are not already in a fingerprint index including comparing each fingerprint in the new snapshot with each fingerprint in the fingerprint index;

causing a second set of segments associated with the second set of fingerprints to be stored in a backup data storage system;

causing the second set of fingerprints to be added to the fingerprint index;

identifying a third set of fingerprints in the new snapshot that are not found in a list of fingerprints in a target snapshot;

deleting a first subset of data stored in the data storage device, wherein the first subset of data are associated with the third set of fingerprints;

retrieving a second subset of data from the backup data storage system, wherein the second subset of data are associated with fingerprints that are found in the list of fingerprints in the target snapshot; and inserting the second subset of data into appropriate locations in the data storage device.

11. The method as in claim 10, wherein the data storage device for storing data comprises a block storage system.

12. The method as in claim 10, wherein the backup data storage system comprises a deduplicating storage system.

13. The method as in claim 10, wherein a block is associated with one or more segments of the set of segments.

14. The method as in claim 13, wherein the block is restored by reading the one or more segments from the backup data storage system and used to reconstruct the block.

15. The method as in claim 14, further comprising transferring the one or more segments from the backup data storage system to the data storage device.

16. The method as in claim 15, wherein transferring the one or more segments comprises transferring the one or more segments requested by a user.

17. The method as in claim 10, wherein the new snapshot is one of a plurality of snapshots.

18. The method as in claim 10, wherein the new snapshot is associated with a snapshot time.

19. A computer program product for processing data, the computer program product being embodied in a non-transitory computer readable storage medium and comprising computer instructions for:
dividing a set of data in a data storage device into a set of segments;

computing, using a processor, a set of fingerprints, wherein the set of fingerprints comprises a fingerprint for each segment of the set of segments;

storing the set of fingerprints in a new snapshot stored in the data storage device, wherein the new snapshot comprises an indication of the set of segments at a given point in time;

identifying a second set of fingerprints in the new snapshot that are not already in a fingerprint index including comparing each fingerprint in the new snapshot with each fingerprint in the fingerprint index;

causing a second set of segments associated with the second set of fingerprints to be stored in a backup data storage system;

causing the second set of fingerprints to be added to the fingerprint index;

identifying a third set of fingerprints in the new snapshot that are not found in a list of fingerprints in a target snapshot;

deleting a first subset of data stored in the data storage device, wherein the first subset of data are associated with the third set of fingerprints;

retrieving a second subset of data from the backup data storage system, wherein the second subset of data are associated with fingerprints that are found in the list of fingerprints in the target snapshot; and inserting the second subset of data into appropriate locations in the data storage device.

\* \* \* \* \*